UNITED STATES PATENT OFFICE.

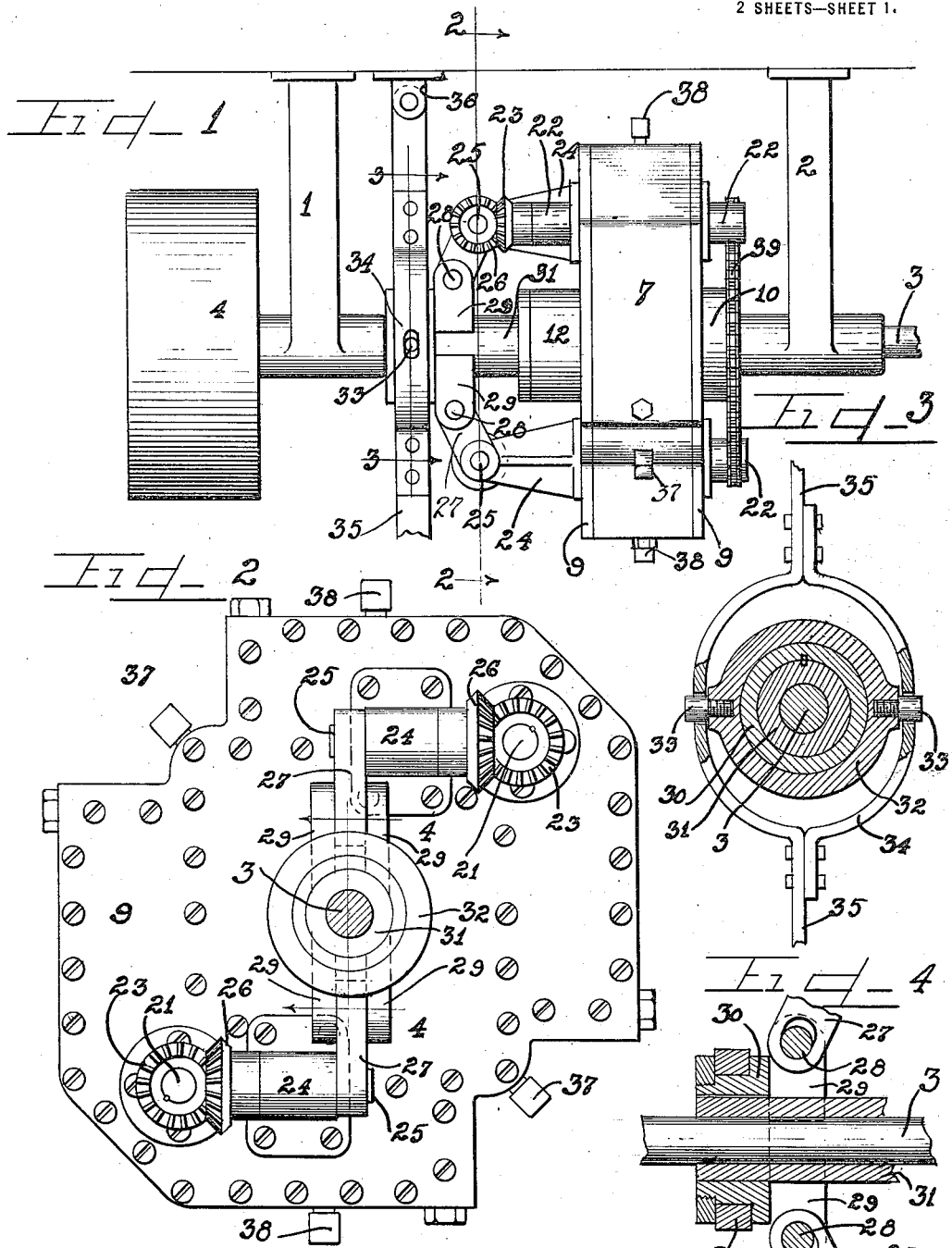

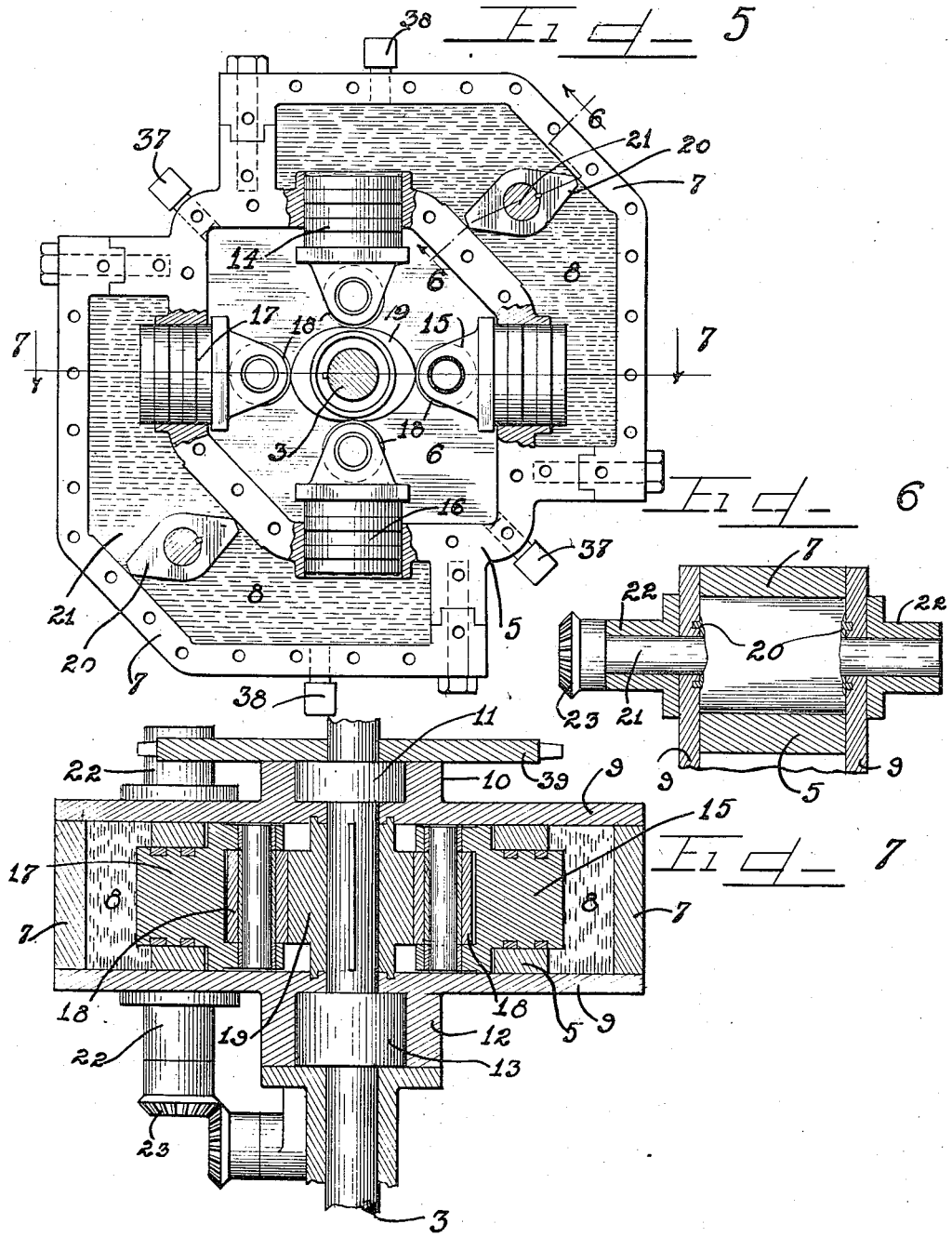

ALFRED SHACKLETON, OF CHICAGO, ILLINOIS.

VARIABLE-SPEED POWER-TRANSMISSION DEVICE.

1,375,327.  Specification of Letters Patent.  Patented Apr. 19, 1921.

Application filed April 20, 1917. Serial No. 163,340.

*To all whom it may concern:*

Be it known that I, ALFRED SHACKLETON, a citizen of the United States, and a resident of the city of Chicago, in the county of Cook and State of Illinois, have invented certain new and useful Improvements in Variable - Speed Power - Transmission Devices; and I do hereby declare that the following is a full, clear, and exact description of the same, reference being had to the accompanying drawings, and to the numerals of reference marked thereon, which form a part of this specification.

This invention relates to an improved form of variable speed power transmission devices wherein the resistance to the flow of a fluid in the mechanism is regulable to vary the rate of drive or slippage between the driving and driven members, and when the flow of fluid is prevented, the driving and driven elements rotate as a unit.

My invention contemplates the use of a plurality of pistons arranged in pairs and operated by a single driven cam member whereby one piston of each pair is operated inwardly, as the other piston moves outwardly, and with means governing the flow of the fluid contained in the compartments into which said pistons communicate, from one end of the compartment to the other, thereby varying the resistive effect of the pistons to movement of the cam, so that the member carrying the pistons may be positively rotated by the cam without slippage when the resistance to movement of the pistons is greater than the load imposed upon the mechanism.

It is an object therefore of this invention to construct a transmission mechanism of the class described whereby the rate of drive between the driving and driven member may be varied by control of the flow of fluid in the mechanism, and with means operating to restrict the flow of fluid whereby the driving and driven elements are caused to rotate as a unit, and when so rotating, with no flow of fluid taking place to cause heating or leakage thereof.

It is also an object of this invention to provide a transmission mechanism for connection between driving and driven members, with means for controlling the flow of fluid through the mechanism to govern the slippage or rate of drive between the driving and driven members, and by arresting the flow of the fluid, causing a direct driving connection between the driving and driven members.

It is a further object of this invention to provide a hydraulic transmission mechanism with a number of pistons actuable by a single cam, whereby one piston of a pair is moved outwardly to exert pressure on the fluid as another piston moves inwardly to relieve the fluid pressure, and with regulating means between the pistons of each pair to govern the flow of fluid therebetween and thereby control the slippage of the mechanism, or cause a direct drive to be transmitted therethrough by preventing a flow of the fluid.

Other and further important objects of the invention will be evident from the disclosure in the drawings and specification.

The invention (in a preferred form) is illustrated in the drawings and hereinafter more fully described.

On the drawings:

Figure 1 is a top plan view of a driving and driven mechanism embracing a hydraulic transmission embodying the principles of my invention.

Fig. 2 is a sectional detail taken on line 2—2 of Fig. 1, showing the housing in elevation.

Fig. 3 is a sectional detail on line 3—3 of Fig. 1.

Fig. 4 is a sectional detail on line 4—4 of Fig. 2.

Fig. 5 is an interior view of the mechanism with one of the side wall plates detached, and with parts shown in section.

Fig. 6 is a sectional detail taken on line 6—6 of Fig. 5, showing parts in elevation and with parts broken away, and Fig. 7 is a sectional detail taken on line 7—7 of Fig. 5, with parts in elevation.

As shown on the drawings:

Referring to Fig. 1, a pair of bearing brackets 1 and 2, respectively, are provided, and journaled therethrough is a shaft 3, on one end of which is secured a driving pulley 4. Journaled on said shaft 3, is a casing comprising an inner casing 5, with a chamber 6, therein, and with removable cover plates 7, affording fluid chambers 8, between the same and the inner casing 5, and with side wall plates 9, secured upon said assembled inner casing member 5, and cover plates 7. One of said side wall plates 9, is provided with a hub 10, within which a collar 11, secured upon the shaft 3, is disposed, and the other plate 9, is provided with a hub 12, within which another collar 13, is disposed, thus holding the casing assembly positively positioned rotatably upon the shaft 3. Slidably and radially mounted in the walls of the inner casing 5, are fluid tight pistons 14, 15, 16 and 17, respectively, the inner ends of all of which are disposed within the chamber 6, as shown in Fig. 5. Yokes are formed upon the inner ends of each of said pistons, and journaled therein are rollers 18, adapted to track upon the cam 19, on the shaft 3, and disposed within the compartment 6. The shape of the cam 19, is such that when the piston 14, and the piston 16, are in their inner positions, the respective pistons 15 and 17, are in their outer positions, and as the cam rotates and the pistons 15 and 17, travel inwardly, the pistons 14 and 16, travel outwardly, so that the displacement movement of each of the respective pairs of pistons in the chambers 8, is exactly equal.

Centrally mounted in each of the compartments 8, are completely submerged double or balanced valves 20, each of which is mounted upon one of two shafts 21, journaled through stuffing boxes 22, in the side wall plates 9, and each shaft is provided on its outer end with a miter pinion 23. Mounted upon one of the side plates 9, as clearly shown in Figs. 1 and 2, are bearing brackets 24, in the outer ends of which are transversely journaled short shafts 25, with a miter pinion 26, secured on each thereof meshing with the respective miter pinions 23. Also connected upon the shafts 25, are cranks 27, and the inner ends of said cranks are slotted, as shown in detail in Fig. 4, and engaged upon pins 28, secured between pairs of brackets 29. Said bracket members 29, are secured upon a collar 30, journaled upon a sleeve member extension 31, which, at its inner end, is secured to the hub 12, in any suitable manner. Journaled upon the collar 30, is a ring 32, provided with pins 33, diametrically disposed thereon, which extend through slots provided in a yoke 34, forming a part of a control lever 35, which is pivoted in a bracket 36, secured to any stationary support such as that on which the bearings 1, are mounted.

As shown clearly in Fig. 5, filling apertures closed by threaded plugs 37, are provided in the casing 5, communicating into the chamber 6, whereby a lubricant may be introduced thereinto, and similarly, filling apertures closed by plugs 38, are provided communicating through the cover plates 7, into the respective chambers 8, for introduction of the transmission fluid thereinto. Attached upon the hub portion 10, of the side wall plates 9, is a large sprocket wheel 39, or other suitable means for transmitting the drive from which power may be taken from the transmission.

The operation is as follows:

A continuous drive from any source of power is transmitted to the pulley 4, or its equivalent, which rotates the drive shaft 3. When the transmission handle 35, is in its position shown in Fig. 1, the valve members 20, within the mechanism casing, will be closed, as shown in Fig. 5, and the transmission will be caused to rotate as a unit with the drive shaft 3, so that power may be taken from the sprocket 39, or its equivalent. However, if the arm 35, is shifted to rotate the intermeshing pinions 23 and 26, to thereby shift the valves 20, into open position, the mechanism will not rotate with the drive shaft 3. This is for the reason that the cam 19, upon the drive shaft 3, rotating therewith, travels beneath the respective rollers 18, of the respective pistons, causing certain ones of the pistons to be moved inwardly thereby displacing the fluid within the respective chambers 8, past the open valves 20, and causing other of the pistons to move outwardly. The cam 19, is of peculiar design to effect proper operation of the respective pistons. That is, each 90° portion or sector is exactly similar to every other 90° portion, and the cam is symmetrical owing to the symmetrical arrangement of the pistons. If the pistons were not arranged symmetrically, the cam would not be symmetrical and, of course, such variations in design come well within the scope of my invention. As the cam is designed, an outward pressure movement of one piston of a pair is effected, when the valve for that chamber is open, which is identical with the extent of movement permitted the other piston. That is, the respective rollers on the pistons track over the cam surfaces at all times, the extent and velocity of radial movement of each piston of a pair being the same for given movements of the cam. The displacement of the pistons, when permitted to take place, is always equal and opposite. If this condition did not obtain, the mechanism might lock hydraulically, or conversely, a void might form to admit of fluid slippage, thus interfering with the regulation of control of the mechanism. Another factor determining the symmetry of the cam member is the reversibility of the mechanism for identical operation in either direction. The drive shaft may be rotated in either direction and the mechanism caused to move therewith, owing to the fact that the curve of the lift surfaces of the cam, however considered, is the same as the curve of the release surfaces.

For instance, referring to Fig. 5, assuming the cam 19, to rotate in a clockwise direction, the piston 15, will begin to move inwardly, thereby causing a flow of the fluid in the chamber 8, toward that end of the chamber and from that in which the piston 14, is mounted, which is then moving outwardly. When the valve 20, is fully open, there will be no resistance to the flow of fluid, and no resistance to the movement of the cam 19, by the mechanism, and therefore merely an unrestricted reciprocation of the pistons in the casing will take place without a drive from the mechanism.

Any degree of drag between the mechanism and the drive shaft 3, may be obtained by proper adjustment of the valves 20, which are at all times wholly submerged in the transmission fluid and balanced, so that different speeds of transmission of power by the mechanism from the driving means may be thus obtained, dependent on the degree of opening of the valves. It is understood, of course, that all joints within the mechanism positively seal the transmission fluid therein, so that no leakage nor voids can occur to affect the positive and graduated action of the transmitting fluid.

I am aware that various details of construction may be varied through a wide range without departing from the principles of this invention, and I therefore do not purpose limiting the patent granted otherwise than necessitated by the prior art.

I claim as my invention:

1. A fluid transmission comprising a casing, a plurality of fluid compartments therein, a plurality of pistons each provided with a roller at the inner end thereof and alternately reciprocative adapted to be projected into each of said compartments to alternately effect transfer of fluid from one end to the other in said respective compartments, means in each of said compartments between the pistons thereof controlling the transfer of fluid therethrough to vary the resistive pressure effect of the inward movement of a piston, and a driving cam coöperating with the rollers on the pistons and shaped to effect alternate reciprocative movements of the pistons in each of said compartments.

2. A fluid transmission mechanism comprising four reciprocative elements arranged at right angles to each other, a unitary symmetrical cam member for effecting simultaneous actuation thereof, each quadrant of the cam member being a section of an Archimedean spiral whereby each element of a pair moves an equal amount and at the same velocity and in an opposite relative direction to the other element of the pair.

In testimony whereof I have hereunto subscribed my name in the presence of two subscribing witnesses.

ALFRED SHACKLETON.

Witnesses:
CHARLES W. HILLS, Jr.,
EARL M. HARDINE.